Dec. 11, 1951  F. GAGNAIRE  2,578,347
SIGNAL TRANSMITTING DEVICE FOR VEHICLES
Filed July 29, 1947  3 Sheets-Sheet 1

Inventor
François Gagnaire
By Alexander Dowell
Attorneys

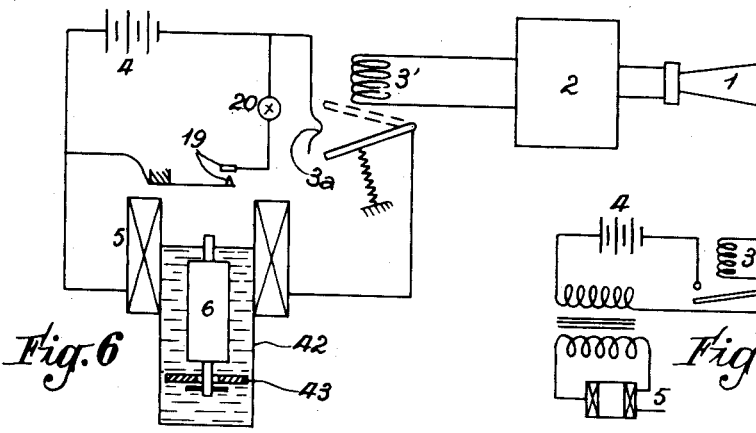
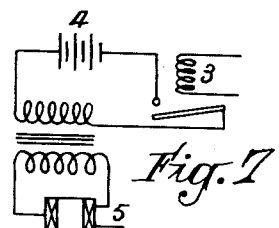
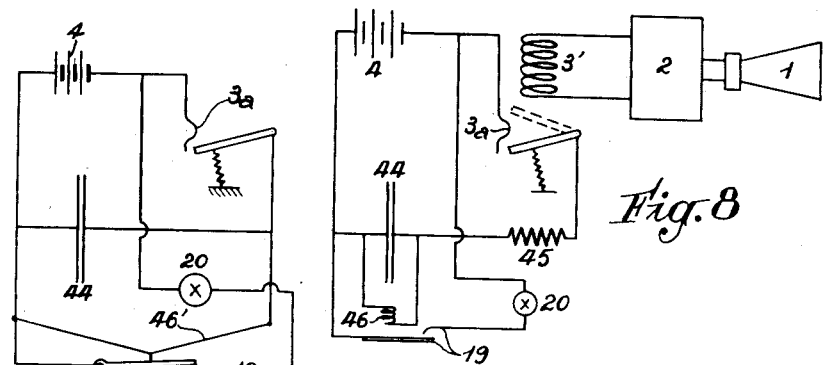
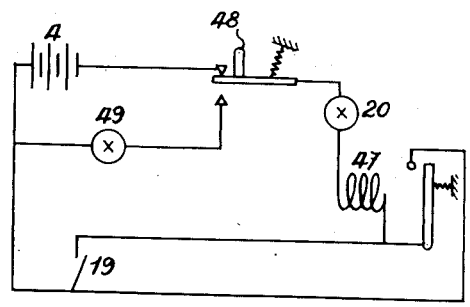

Patented Dec. 11, 1951

2,578,347

UNITED STATES PATENT OFFICE 2,578,347

SIGNAL TRANSMITTING DEVICE FOR VEHICLES

François Gagnaire, Lyon, France

Application July 29, 1947, Serial No. 764,500
In France April 4, 1944

Section 1, Public Law 690, August 8, 1946
Patent expires April 4, 1964

7 Claims. (Cl. 177—352)

My invention relates to the transmission to a vehicle driver of signals from a following vehicle.

It is well-known that it is difficult for the driver of a truck or other vehicle of large dimensions to perceive signals from another vehicle wishing to pass in front. Acoustic signals are drowned in the noises of the truck and luminous signals are only visible at night. Arrangements have been proposed for transmitting the sound from the rear of the vehicle to the driver's seat but either they are simple trumpets which have not proved altogether satisfactory, or they are devices which tend to deafen the driver by transmitting all the noises of the truck including that of the exhaust which is particularly intense at the rear. If in lieu of transmitting sounds to the driver one seeks to give him an indication from an apparatus set in action by luminous signals, the apparatus may respond unsuitably to daylight, for instance when the sun is low on the horizon, or when going downhill.

It has been proposed to obviate these inconveniences by providing on the overtaking car an emitter emitting acoustic signals of definite frequencies and on the truck or the like a receiver tuned to the corresponding frequencies which are inaudible or almost inaudible, or by employing wireless transmission between the two cars. But these devices require a particular arrangement on the overtaking car.

My invention permits on the contrary to use on the overtaking car the usual horns or like acoustic devices, or the headlights.

According to my invention a system for transmitting to a vehicle driver signals from a following vehicle comprises a totalising apparatus submitted to the action of a zeroing mechanism which tends to return the said apparatus to its position of rest at a limited speed, a signal receiver adapted to deliver an impulse to the said apparatus for each signal received, and an indicating device set in action by the totalising apparatus when the latter has received a sufficiently high number of impulses in a sufficiently short time.

In the accompanying drawings:

Fig. 1 is a diagrammatic view of an arrangement in accordance with the invention having a hydraulic totaliser.

Figs. 2 to 5 indicate diagrammatically various mechanical arrangements of a mechanical totaliser apparatus.

Figs. 6 to 8 show electric totaliser apparatus.

Fig. 9 shows a totalizer apparatus operated thermally.

Fig. 10 is a diagram of a device ensuring a durable indication of the signals received and wherein the release of this indication is combined with the emission of a reply signal.

Figure 1:
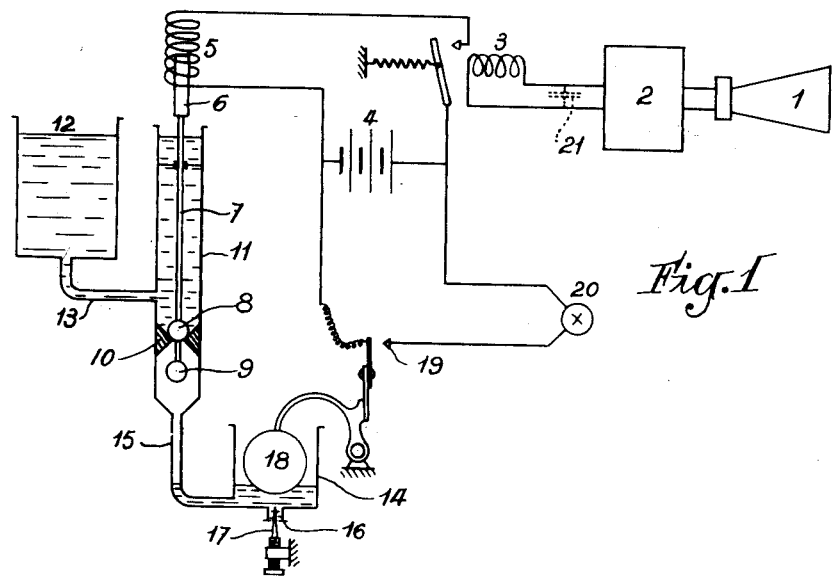

In Fig. 1 acoustic signals are received by a microphone 1 which sends a current into an amplifier 2 which in turn supplies a relay 3. The latter closes a circuit comprising a battery 4 and a coil 5 raising a plunger core 6 connected to a rod 7 carrying two small spheres 8 and 9 forming opposite valves cooperating oppositely with the same seating 10 within a vertical tube 11. Tube 11 is connected above the seat 10 to a reservoir 12 by a pipe 13 and it supplies in turn a vessel 14 by way of a pipe 15 opening beneath the said seating. This vessel 14 is provided with a small outlet 16 regulated by a needle 17. It encloses a float 18 which, when the level rises sufficiently, actuates a contact 19 closing a circuit which comprises the battery 4 and a lamp or other indicating apparatus 20 disposed adjacent the driver.

On each signal received by microphone 1 relay 3 closes the circuit and coil 5 raises rod 7 causing sphere 9 to close from beneath the passage which in the position of rest is closed from above by sphere 8. In this movement a certain quantity of liquid passes down through tube 11 and enters vessel 14. If the successive impulses received by relay 3 are sufficiently close to each other, the quantity of liquid received by vessel 14 within a given time is higher than the quantity lost by outlet 16; the level rises within the said vessel 14 and float 18 actuates the indicator 20.

It will be understood that with a proper adjustment the totalising apparatus will operate indicator 20 when the driver of the vehicle desiring to pass the truck operates his warning note repeatedly for a sufficient length of time. But it will be insensitive to a noise which is isolated even if this is of long duration.

Relay 3 should however be suitably insensitive to impulses having a very rapid succession, such as those which may result from the noise of the exhaust. This result can be obtained by giving to the movable part of relay 3 a sufficiently high moment of inertia so that it will not be able to follow very short impulses very close to each other and will remain either open or closed according as the impulses are feeble or strong, the latter case being exceptional, since short impulses involve limited quantities of electricity. It could also be arranged that the amplifier 2 forms a rectifier or is associated with a rectifier in such manner that the supply current of the said relay may be direct current. It is then sufficient to provide a condenser 21 mounted in shunt on the coil of the relay to damp current impulses of high frequency and to obtain with such impulses a continuous current which leaves relay 3 open or closed continuously. Finally the coil of the relay may also be provided with short-circuited windings or rings giving it a very high time constant in the known manner; such a coil has a very high reactance whereby the relay is much more sensitive to impulses of low frequency than to those of high frequency. Obviously these various means may be combined.

For a better understanding of my invention it may be remarked that in a succession of acoustic or luminous signals two kinds of frequencies may be involved: first, the frequency of the sound or light used for the signal, for instance 500 periods per second in the case of an acoustic signal; second, the frequency of the succession of signals, for instance 100 per minute. The first frequency has formed the discriminating means in the prior art, while it is immaterial with my invention which is only concerned with the second one. And as my invention is more conveniently carried into practice by means of acoustic signals delivered by repeated actuation of a push-button or the like, this frequency will thereafter be termed keying frequency of the signal.

From the above it follows that my apparatus is finally sensitive to a wide band of keying frequencies, which eliminates isolated sounds or the exhaust noise (at 1000 R. P. M. the exhaust frequency of a four-cylinder engine is 2000).

The receiver I may be a luminous receiver with a photoelectric cell sensitive to rays emanating from the headlights of vehicles which are asking to pass. In this case without any particular arrangement of the amplifier the current received by the relay 3 is a direct current without the need for a rectifier. If desired two receivers respectively light and sound sensitive may act in parallel to control relay 3.

The amplifier 2 is not absolutely necessary and may be dispensed when relay 3 is sensitive to unamplified microphone currents.

Figure 2:
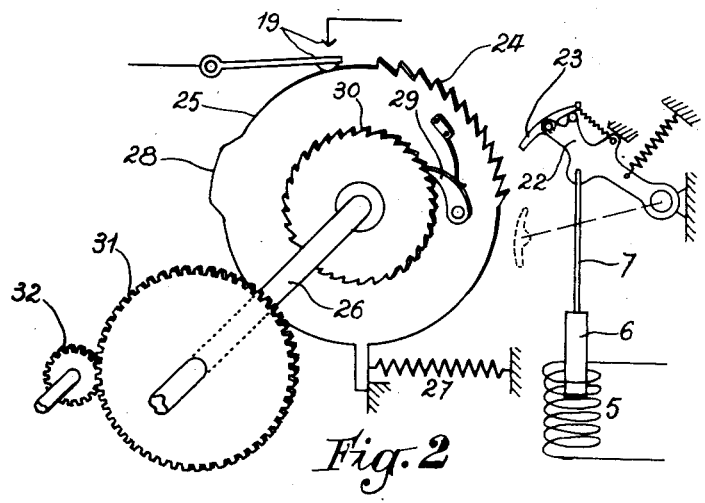

Fig. 2 shows a mechanical construction of a totalising apparatus. The core 6 actuates a lever 22 carrying a pawl 23 which cooperates with a ratchet 24 carried by a wheel 25 loose on a shaft 26. Wheel 25 is returned by a spring 27 and carries a boss 28 adapted to actuate the contact 19. It carries also a pawl 29 which on the return movement of the wheel 25 under the action of the spring 27 drives a ratchet wheel 30 keyed on shaft 26. The latter carries a wheel 31 which engages a clockwork mechanism 32 of any suitable construction diagrammatically indicated by a mere pinion so as not to complicate the drawing.

At each impulse pawl 23 causes wheel 25 to advance against the action of the spring 27. The latter tends to return it but this return can only be effected by driving a clockwork movement, that is to say at a relatively slow speed so that with sufficiently numerous and rapid impulses boss 28 may actuate the contact 19.

The inertia of lever 22 and of core 6 may be sufficient to eliminate impulses of too high keying frequency even apart from the characteristics of the relay 3.

Figure 3:
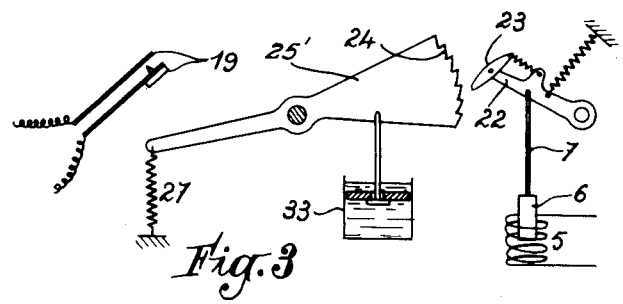

The arrangement shown in Fig. 3 provides a pivoted sector 25' having teeth 24 which teeth are engaged and moved downwardly by a pawl 23 when the solenoid 5 is energized. A spring 27 provides a constant force tending to raise the toothed end of the sector 24, and this raising effect is partially opposed by a dash pot 33 which regulates the rate of rising thereof, but does not oppose lowering of the toothed sector 24 when acted upon by the pawl 23.

Figure 4:
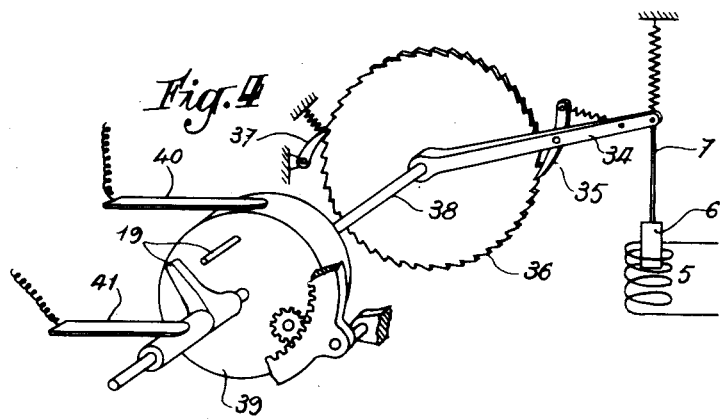

In Fig. 4 the core 6 operates an arm 34 which by means of a pawl 35 drives a wheel 36 which is prevented by a second pawl 37 from turning backwards. Wheel 36 drives a shaft 38 on which there is mounted a rotating clockwork movement 39 of the kind used on delaying apparatus controlling electric switches. It is known that these movements are returned by an internal spring to a fixed angular position on the shaft which carries them but that this return is delayed while the delaying mechanism does not operate when they are moved from the set position against the return spring. The contact 19 comprises here a beak in one with the shaft and a finger in one with the casing of the movement, the current being supplied to these two parts by suitable brushes 40 and 41.

The current impulses received by the coil 5 cause the contact beak to turn in the clockwise direction while the corresponding finger follows in the same direction but at slow speed. Impulses having a sufficient keying frequency produce closing of the contact 19 as in the preceding instance.

Figure 5:
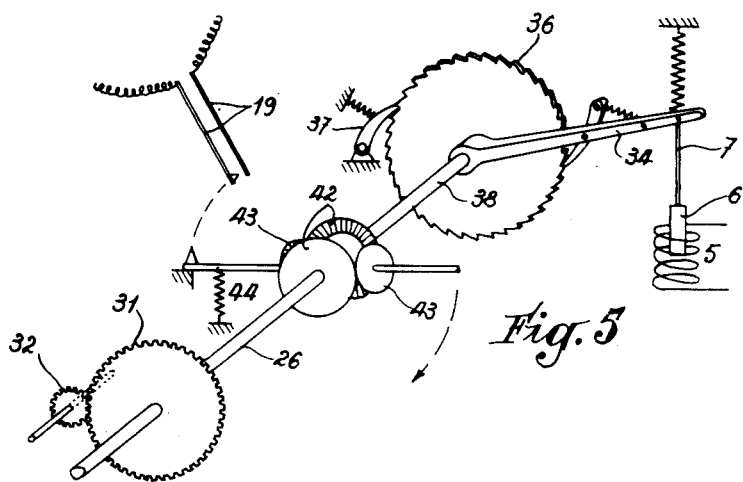

In Fig. 5 the wheel 36 and the clockwork movement here represented diagrammatically by a pinion 32 as in Fig. 2 are connected by a differential gearing 42, 43 the planetary train 43 of which is returned by a spring 44 and may moreover actuate the contact 19 when it has been sufficiently moved from its position of rest against the action of the said spring. Here again it will be understood that the impulses tend to cause the planetary train 43 to rotate in clockwise direction while the spring 44 tends to return it in the opposite direction but driving the movement 42 which imposes a slow speed. The operation thus remains the same as in the preceding instance.

In the apparatus according to Fig. 6 the relay 3' is arranged to send only a short current impulse at each impulse which it receives from the amplifier 2. For this purpose the fixed contact 3a for the circuit is actuated so as to touch the movable bar only during a fraction of movement of the latter. On the other hand the coil 5 is disposed around a hydraulic vessel 42 in which the core 6 is vertically movable; core 6 is connected to a washer 43 forming a piston which is not completely tight in the vessel 42. Vessel 42 is filled with oil or other liquid. Washer 43 forms an automatic valve permitting rapid upward movement but ensuring slow downward movement of the core 6.

At each short current impulse received by relay 3' core 6 rises by a small amount, but between the successive impulses it falls slowly retarded by washer 43. Here again a proper keying frequency causes core 6 to rise sufficiently to actuate the contact 19.

The short current impulse necessary for each signal may also be obtained by interposing a transformer or a condenser between a relay 3 such as that shown in Fig. 1 and the said coil 5. Fig. 7 indicates such an arrangement and makes it clear that the coil 5 receives only a short current impulse on the closing and opening of relay 3. The same result would be obtained by arranging a condenser shunted by suitable resistance in series with the coil 5.

Fig. 8 shows an electric totalising apparatus constituted by a condenser 44 of large capacity (an electrolytic condenser for example) charged by a relay 3' of the kind described in Fig. 6 with a resistance or reactance 45 interposed so that the charge may be aperiodic. Condenser 44 is discharged on a relay 46 having a very high resistance which operates the contact 19. At each impulse coming from the relay 3' the condenser 44 receives an elementary charge which escapes by the winding of the relay 46 in the form of a current of very small intensity and insufficient to actuate the relay. If the impulses succeed one another with a sufficient keying frequency the successive charges accumulate, the voltage rises and the intensity of the discharge current increases until it is sufficient to actuate the relay 46 and close the contact 19.

Here again an ordinary relay could be used in lieu of the relay 3' by interposing a transformer but it would be necessary moreover to provide a rectifying device so as to allow only a single charging wave for the secondary of the transformer to pass.

In Fig. 9 the totalising apparatus is a thermal relay with a hot wire fed by very short current impulses produced by a relay 3a of the kind illustrated in Figs. 6 and 8, but which can also be produced by a transformer. An isolated impulse is insufficient for the hot wire 46' to close the contact 19 but several successive impulses sufficiently close to each other may produce this result. The condenser 44 has been retained so as to accumulate a considerable charge of electricity at each closure of the circuit by relay 3a and avoid having to employ too fine a wire 46', but this is obviously not essential.

It is clear that in lieu of a hot wire there could be used a bimetal strip combined with a small heating resistance. It is also clear that the thermal relay may be suitably compensated so as to be insensitive to variations in external temperature.

The thermal relay permits easy regulation of the keying frequency limits. It is sufficient to isolate it more or less in order to vary the speed of cooling of the sensitive element.

It will be understood that the examples of totalising apparatus could be multiplied without departure from the scope of the invention.

In the preceding examples of construction the indicating apparatus 20 only operates while the contact 19 is closed. This relatively short indication does not persist and may pass unperceived by the driver.

Fig. 10 shows a device remedying this disadvantage. The circuit of apparatus 20 comprises a relay 47 the armature of which is arranged in order to close the said circuit (self-adhering relay). Contact 19 is disposed in shunt with the contact operated by the armature. With such an arrangement a momentary operation of contact 19 is sufficient to cause relay 47 to close in a permanent manner the circuit of apparatus 20. The driver is thus warned with certainty. In order to cause the indication to disappear it is sufficient in a known manner to press the contact-separating stud 48. As shown stud 48 is double and comprises a contact controlling a reply signal 49 so as to warn the driver of the following vehicle that his call has been heard and that he is to be allowed to pass. Owing to this arrangement the driver of the truck cannot fail to respond and until he has done so, the driver of the following vehicle knows that his signal should be repeated in order to be effective.

Other mechanism ensuring the permanence of operation of the indicator 20 once it has been closed may be imagined. For example a mechanical releasing mechanism may be provided which it would be necessary to reset being combined with the reply signal 49.

I claim:

1. A system for installation in a vehicle to operate indicating means in said vehicle when excited by signals transmitted from a following vehicle, said signals being repetitive and being within a limited operative range with respect to length of signal and spacing therebetween, said system comprising a signal receiver having means for converting the individually received signals independent of their lengths into pulses of constant length and amplitude; a differential totalizer having means for increasing the totalizer content incrementally for each pulse received and having means for decreasing the totalizer content at a fixed and continuous rate, the rate of the decreasing means being so related to the rate of the converted pulses when received at a rate within the operative range as to permit the totalizer to reach a predetermined totalized content; and an indicator actuated by said totalizer when it attains said predetermined content.

2. In a system as set forth in claim 1, damping means in said receiver to prevent actuation of said totalizer increasing means by signals which repeat at a rate outside of and above said operative range.

3. In a system as set forth in claim 1, said converting means comprising a relay in said receiver, said relay having an armature adapted to be closed by each signal received; a contact spaced from the closed position of the armature and adapted to be brushed thereby during each closing motion; and a source of constant voltage between the relay and said increasing means whereby a pulse is transmitted from said source to the increasing means as the armature brushes the contact.

4. In a system as set forth in claim 1, said differential totalizer comprising a liquid collecting vessel; a float in said vessel responsive to the liquid level therein; a switch closed by said float when it reaches a predetermined level, the switch operating said indicator; said increasing means comprising a liquid delivering device adapted to deliver a fixed quantity of liquid to the vessel for each pulse received; and said decreasing means comprising a restricted orifice in the vessel to permit outflow of liquid therefrom at a limited rate.

5. In a system as set forth in claim 1, said pulses being electrical in nature and said differential totalizer comprising a switch adapted to operate said indicator; and a heat responsive element adapted to close the switch when the element reaches a predetermined temperature, the element receiving said electrical pulses and being heated thereby, and being simultaneously cooled by natural heat losses.

6. In a system as set forth in claim 5, said electrical impulses being unidirectional in character, an electrical condenser across said heat responsive element to smooth out surges in said impulses reaching the element.

7. In a system as set forth in claim 1, said pulses being electrical and unidirectional in nature, and said differential totalizer comprising an electric condenser adapted to be charged by said pulses; and a voltage responsive relay in parallel with said condenser and adapted to slowly discharge the condenser at a fixed rate, said relay when closed actuating said indicator.

FRANÇOIS GAGNAIRE.

REFERENCES CITED

The following references are of record in the file of this patent:

UNITED STATES PATENTS

| Number | Name | Date |
|---|---|---|
| 1,092,732 | McCarthy | Apr. 7, 1914 |
| 1,368,736 | Lavigne | Feb. 12, 1921 |
| 1,792,479 | Bennett | Feb. 17, 1931 |
| 2,007,371 | Hopkins et al. | July 9, 1935 |
| 2,176,742 | La Pierre | Oct. 17, 1939 |
| 2,394,786 | Korneke | Feb. 12, 1946 |
| 2,507,359 | Weiss | May 9, 1950 |

FOREIGN PATENTS

| Number | Country | Date |
|---|---|---|
| 458,786 | Great Britain | Dec. 28, 1936 |
| 594,336 | Great Britain | Nov. 7, 1947 |
| 127,641 | Austria | Apr. 11, 1932 |
| 432,865 | Great Britain | Sept. 4, 1935 |
| 430,459 | Great Britain | June 19, 1935 |
| 419,803 | Great Britain | 1933 |
| 463,416 | Great Britain | Mar. 30, 1937 |